(12) United States Patent
Dieckmann et al.

(10) Patent No.: US 12,090,995 B2
(45) Date of Patent: Sep. 17, 2024

(54) METHOD FOR PREDICTIVE ASSESSMENT OF A CURRENT DRIVING SITUATION AND ASSESSMENT MODULE

(71) Applicant: WABCO GmbH, Hannover (DE)

(72) Inventors: Thomas Dieckmann, Pattensen (DE); Stephan Kallenbach, Hannover (DE); Sebastian Kuehne, Sarstedt (DE); Ralph-Carsten Luelfing, Garbsen (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 885 days.

(21) Appl. No.: 16/628,693

(22) PCT Filed: May 18, 2018

(86) PCT No.: PCT/EP2018/063160
§ 371 (c)(1),
(2) Date: Jan. 6, 2020

(87) PCT Pub. No.: WO2019/007584
PCT Pub. Date: Jan. 10, 2019

(65) Prior Publication Data
US 2020/0180609 A1      Jun. 11, 2020

(30) Foreign Application Priority Data

Jul. 7, 2017    (DE) ...................... 10 2017 006 434.2

(51) Int. Cl.
*B60W 30/09*      (2012.01)
*B60T 8/174*      (2006.01)
(Continued)

(52) U.S. Cl.
CPC ............. *B60W 30/09* (2013.01); *B60T 8/174* (2013.01); *G06N 3/08* (2013.01); *G06V 20/597* (2022.01)

(58) Field of Classification Search
None
See application file for complete search history.

(56) References Cited

U.S. PATENT DOCUMENTS 7,363,155 B2 *  4/2008  Meister ............. B60K 31/0008
                                                  340/436
9,428,196 B2 *  8/2016  Ono .................. B60W 50/0097
(Continued)

FOREIGN PATENT DOCUMENTS

CN      106553655 A       4/2017
DE    102006059037 A1     6/2008
(Continued)

*Primary Examiner* — Aniss Chad
*Assistant Examiner* — Mahmoud M Kazimi
(74) *Attorney, Agent, or Firm* — Leydig, Voit & Mayer, Ltd.

(57) ABSTRACT

A method for the predictive assessment of a current driving situation of a vehicle, in particular utility vehicle, includes determining currently present driving situation information, wherein the driving situation information characterizes the current driving situation of the vehicle. The method includes specifying the driving situation information to a neural algorithm, wherein the neural algorithm assigns, in the manner of a trained neural network, a driving situation category to the currently present driving situation information. The respective driving situation category is based on a predicted driving situation. The neural algorithm determines the predicted driving situation in accordance with the current driving situation and the predicted driving situation indicates a driving situation of the vehicle which will develop in future from the current driving situation. The method includes outputting an output value characterizing the driving situation category, as an assessment result.

21 Claims, 2 Drawing Sheets

(51) Int. Cl.
*B60W 10/196* (2012.01)
*B60W 40/08* (2012.01)
*G06N 3/08* (2023.01)
*G06V 20/59* (2022.01)

(56) References Cited

U.S. PATENT DOCUMENTS

| | | | |
|---|---|---|---|
| 11,713,041 B2* | 8/2023 | Bast | B60W 10/04 |
| | | | 701/70 |
| 2015/0175161 A1* | 6/2015 | Breed | B60W 30/08 |
| | | | 348/148 |
| 2017/0101093 A1* | 4/2017 | Barfield, Jr. | B60W 50/0097 |
| 2017/0124407 A1* | 5/2017 | Micks | G06V 10/50 |
| 2018/0105186 A1 | 4/2018 | Motomura et al. | |

FOREIGN PATENT DOCUMENTS

| | | | |
|---|---|---|---|
| DE | 102012009297 A1 * | 12/2012 | B60W 30/09 |
| DE | 102015004748 A1 | 10/2016 | |
| DE | 102016120507 A1 | 5/2017 | |
| DE | 102016222579 A1 | 6/2017 | |
| WO | WO 2016170786 A1 | 10/2016 | |

\* cited by examiner

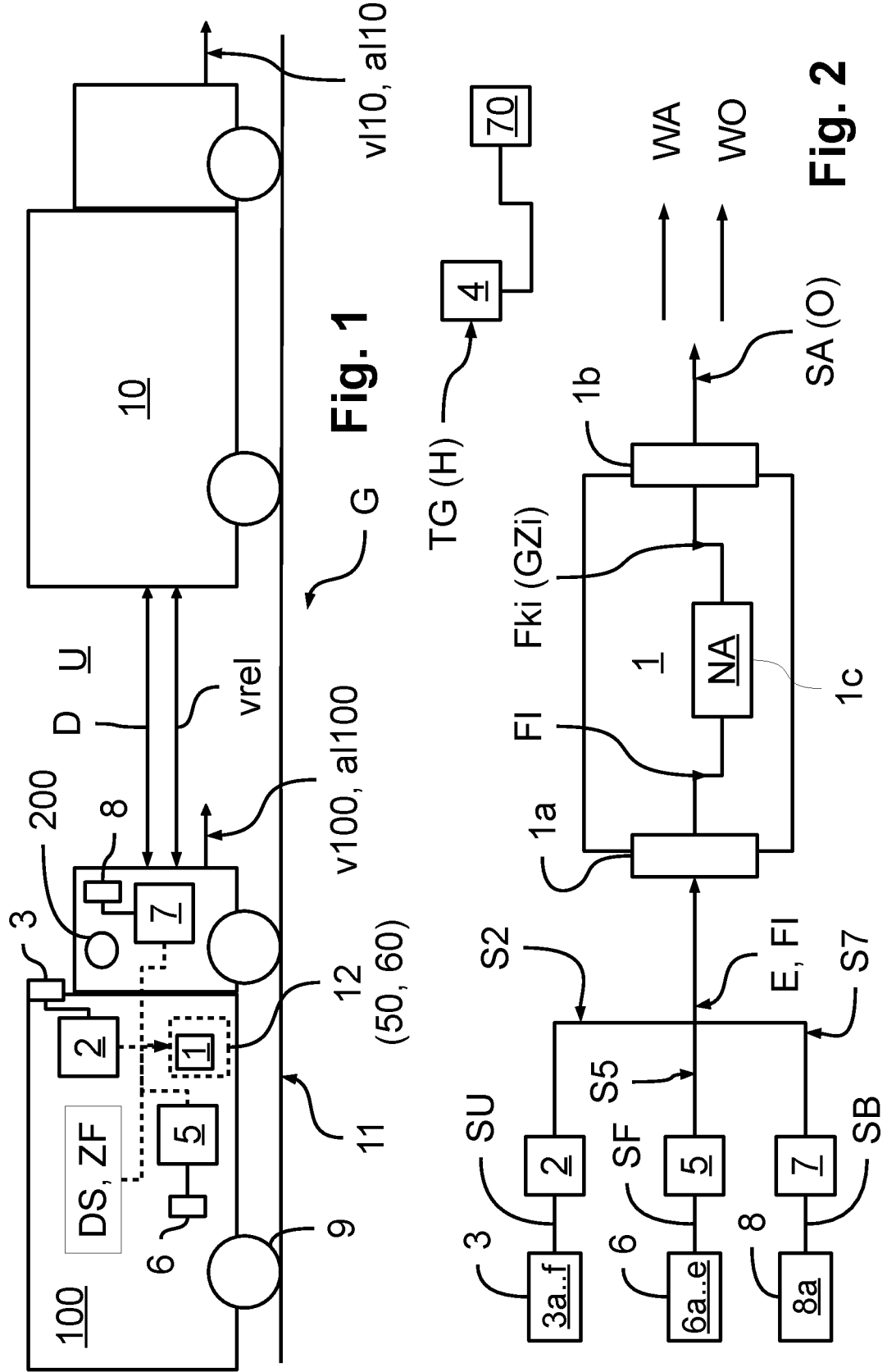

METHOD FOR PREDICTIVE ASSESSMENT OF A CURRENT DRIVING SITUATION AND ASSESSMENT MODULE

CROSS-REFERENCE TO PRIOR APPLICATIONS

This application is a U.S. National Phase Entry under 35 U.S.C. § 371 of International Application No. PCT/EP2018/063160, filed on May 18, 2018, and claims priority to German Patent Application No. DE 10 2017 006 434.2, filed on Jul. 7, 2017. The International Application was published in German on Jan. 10, 2019 as International Publication No. WO 2019/007584 under PCT Article 21(2). The International Application and the International Publication are hereby incorporated by reference.

FIELD

The present invention relates to predictive assessment of a current driving situation of a vehicle, in including a utility vehicle, and to an assessment module for carrying out the method.

BACKGROUND

Accident situations in the driving mode of vehicles, in particular utility vehicles, can have a variety of causes. On the one hand, an accident situation can occur as a result of the fact that objects in the surroundings of the vehicle unexpectedly enter a driving tube of said vehicle. On the other hand, it is, however, also possible for the characteristic of the vehicle surroundings, for example a coefficient of friction of the roadway, to contribute to an accident situation. In order to avoid such accident situations and to minimize the consequences of accidents, sensors are conventionally used in vehicles with which the driving dynamic of the vehicle in question and surroundings of the vehicle can be observed, and it can be assessed, by means of different criteria, for example distances, relative velocities, accelerations, slip values, trajectories etc. whether an accident situation can arise on the basis of the current driving situation between the vehicle in question and an object.

Consequently, on the basis of an assessment of the signals of the sensors that on the basis of the current driving situation there is a high probability of an accident, it is possible to react correspondingly by intervening the brakes within the scope of an emergency braking operation and/or in the steering system in order to avert an accident and to minimize the consequences of an accident. Alternatively or additionally, the driver can be warned about such an accident situation.

Such accident avoidance systems are based on the fact that the current driving situation has already developed as a medium-critical or critical driving situation, i.e. intervention of the driver or of an assistance system is unavoidable in order to avoid an accident or to minimize the consequences of an accident. It can be disadvantageous here that based on the system limitation, i.e. in particular a limited "sensing capability" of the sensors and also the rapidity of the control algorithms for determining the probability of an accident, it is not possible to assess every current driving situation reliably in particular in good time with respect to an imminent accident, so that under certain circumstances intervention takes place too late. Since the vehicle is already in the respective driving situation, consequences of an accident cannot be reliably reduced to a minimum possible extent.

Furthermore, in such systems an incorrect estimation may occur, i.e. an accident situation is predicted, but it does not actually occur. As a result, the acceptance of such accident avoidance systems decreases.

An assessment with respect to future driving situations which are still to occur is possible only to a limited extent, for example by means of predicted trajectories of surrounding objects which, however, can only be predicted reliably for a very limited time period. However, a warning or indication is also output only when the critical driving situation has already developed. Assessments which are already predictive or preventative and also preventative measures for warning an accident, i.e. before such an accident situation can at all develop, are not possible with such systems, so that the abovementioned system limitations cannot be reliably compensated.

SUMMARY

In an embodiment, the present invention provides a method for the predictive assessment of a current driving situation of a vehicle, in particular utility vehicle, includes determining currently present driving situation information, wherein the driving situation information characterizes the current driving situation of the vehicle. The method includes specifying the driving situation information to a neural algorithm, wherein the neural algorithm assigns, in the manner of a trained neural network, a driving situation category to the currently present driving situation information. The respective driving situation category is based on a predicted driving situation. The neural algorithm determines the predicted driving situation in accordance with the current driving situation and the predicted driving situation indicates a driving situation of the vehicle which will develop in future from the current driving situation. The method includes outputting an output value characterizing the driving situation category, as an assessment result.

BRIEF DESCRIPTION OF THE DRAWINGS

The present invention will be described in even greater detail below based on the exemplary FIGS. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows a vehicle in a current driving situation;

FIG. 2 shows an exemplary assessment module for the assessment of the current driving situation of the vehicle according to FIG. 1.

DETAILED DESCRIPTION

Figure 3:
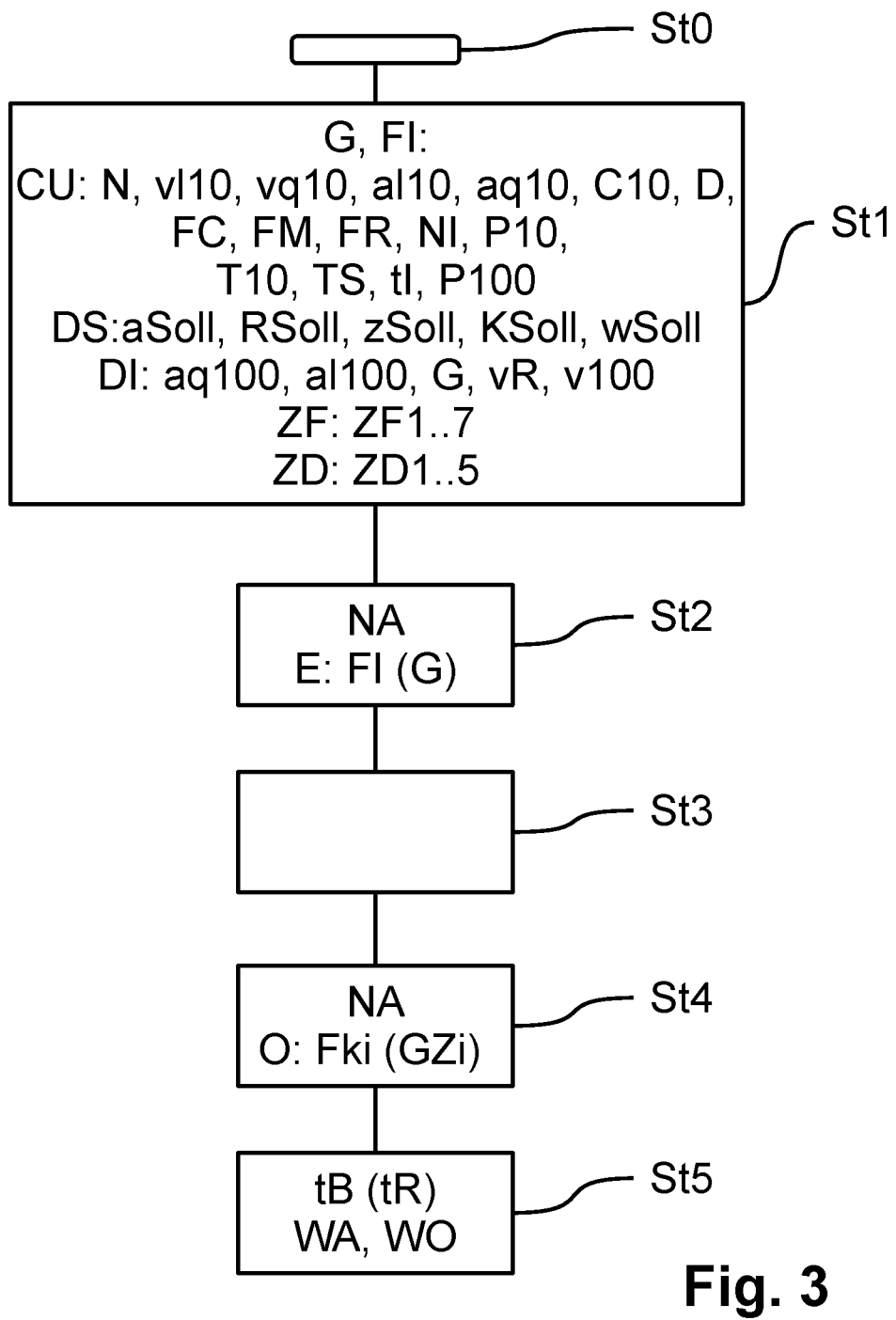
FIG. 3 shows a flow diagram of an exemplary method according to an embodiment of the invention.

In an embodiment, an object of an embodiment of the invention is to disclose a method with which a predictive assessment with respect to an accident situation can be carried out in an easy and reliable way on the basis of a current driving situation. In an embodiment, an object of an embodiment of the invention is also to make available an assessment module for carrying out the method.

According to an embodiment of an embodiment of the invention there is accordingly provision to assess a current driving situation of a vehicle in vehicle surroundings predictively in such a way that the driving situation information which characterizes the current driving situation is fed to a neural algorithm which performs a categorization process in which a driving situation category is assigned to the current driving situation, wherein the driving situation category is based on a predicted driving situation for the future, which driving situation is determined by the neural algorithm in accordance with the current driving situation. The neural algorithm functions according to an embodiment of the invention in the manner of an artificial neural network which is trained to perform this categorization and therefore this predictive assessment.

A predictive assessment of the current driving situation is therefore understood according to an embodiment of an embodiment of the invention as meaning how the events on the road are expected to develop further under the currently present conditions for the vehicle and in which (predicted) driving situation the vehicle is accordingly expected to find itself in the future on the basis of the current driving situation. In this context, the current driving situation also advantageously differs from the predicted driving situation in the future so that advantageously after the assessment and outputting of the assessment result a sufficiently long engagement time period is provided for reaction by the driver before the predicted driving situation actually begins to develop. In this context, an intervention time period is preferably provided which is longer than the driver reaction time, and preferably corresponds to at least twice the reaction time of the driver. That is to say at least 3 to 4 seconds which are sufficient for an adequate reaction by the driver pass until the predicted driving situation is initiated, in order to prepare for the predicted driving situation.

A method according to an embodiment of the invention therefore provides the possibility of reacting to an imminent driving situation which has not yet occurred or is initiated. In this respect, the method according to an embodiment of the invention differs from conventional accident avoidance systems, for example emergency braking assistants or avoidance assistants in which a predictive assessment refers only to the currently present driving situation, for example by means of an assessment of currently present limiting values, e.g. for distances or relative velocities from which an accident situation which is imminent for the current driving situation can be derived. A reaction by the driver can therefore also always only take place when e.g. a problematic or critical driving situation is already present or is already currently developing, so that there is a resulting intervention time period of approximately the driver's reaction time, i.e. less than 3 to 4 seconds which are left for the driver to react.

However, the method according to an embodiment of the invention already permits a preventative reaction of the driver, for example on the basis of a warning which, in accordance with the determined driving situation category, can already be output an intervention time period before the initiation of the predicted driving situation, so that in the current driving situation the driver can adapt his degree of attentiveness in good time to the future development in accordance with the warning. The driver therefore has the possibility of already intervening earlier in the events on the road, e.g. even during the current driving situation which is still uncritical. Therefore, under certain circumstances, a critical driving situation does not develop at all or can be at least already partially alleviated in advance, since the driver preventatively counteracts a development in the direction of a critical driving situation so that activation of a conventional accident avoidance system if one is present can, if appropriate, be completely eliminated.

The driving situation information which characterizes the current driving situation and which is specified to the neural algorithm is dependent here, in particular, on actual driving dynamics of the vehicle, if appropriate including a trailer, and/or setpoint driving dynamics of the vehicle, if appropriate including a trailer, and/or a vehicle surroundings characteristic of vehicle surroundings and/or a driver state of the driver of the vehicle and/or a vehicle state of the vehicle. However, it is also possible to use further information to which the neural algorithm is trained.

Therefore, information from different viewing angles with respect to the current driving situation is advantageously specified to the neural algorithm, which viewing angles can have a significant influence on the current and also the future driving situation of the vehicle, and which viewing angles are in any case already sensed and processed in vehicles with driver assistance systems using corresponding sensors and control devices. Therefore, the assessment can be supported on different criteria. The more driving situation information which is present here and to which the neural algorithm is trained and which can be accessed, the more accurately and reliably the predictive assessment according to an embodiment of the invention can take place.

The actual driving dynamics can be determined in this context, for example, with at least one sensor selected from the group composed of a velocity sensor of the vehicle, a longitudinal acceleration sensor of the vehicle, a lateral acceleration sensor of the vehicle, a yaw rate sensor of the vehicle and a wheel speed sensor on at least one wheel of the vehicle, which sensors are usually present in a vehicle. Moreover, extensive driving situation information which relates to actual driving dynamics of the vehicle can therefore easily be determined, wherein the actual driving dynamics can then be determined, in particular, in accordance with a vehicle velocity of the vehicle, a vehicle longitudinal acceleration of the vehicle, a vehicle lateral acceleration of the vehicle, a yaw rate of the vehicle and/or a wheel speed of at least one wheel of the vehicle, which can be determined by means of these sensors.

The setpoint driving dynamics of the vehicle can preferably be determined in accordance with a retarder setpoint specification for the vehicle and/or a steering angle setpoint specification for the vehicle and/or an accelerator pedal setpoint specification for the vehicle and/or a brake pedal setpoint specification for the vehicle and/or a clutch setpoint specification for the vehicle, which are present in the respective control devices in the vehicle and which can be sensed by means of corresponding sensors at the respective activation device.

The vehicle surroundings characteristic of the vehicle surroundings can be determined, for example, by means of at least one sensor selected from the group composed of a radar sensor of the vehicle, a surroundings camera of the vehicle, an ultrasonic sensor of the vehicle, an infrared sensor of the vehicle and a laser sensor of the vehicle, by means of which sensors the vehicle surroundings can be sensed. In addition, it is possible to have recourse to navigation information of a navigation device of the vehicle.

From these it is possible to derive, as driving situation information which indicates the characteristic of the vehicle surroundings, for example a number of objects in the vehicle surroundings of the vehicle, e.g. other road users, and/or an object longitudinal velocity and/or an object lateral velocity and/or an object longitudinal acceleration and/or an object lateral acceleration and/or an object distance between the vehicle and the respectively detected object and/or an object dimension, e.g. a width and a height of the object, and/or an object type, e.g. a motorcycle, a truck, a passenger car, a bicycle, a person, etc. and/or a relative position between the object and the vehicle, e.g. next to it, in front of it, behind it, etc., and/or a roadway marking of a roadway in the vehicle surroundings, e.g. a continuous line, a dashed line, etc., and/or a roadway characteristic of the roadway, e.g. a width and a number of lanes of the roadway. From the navigation information it is then additionally also possible to acquire a current absolute vehicle position of the vehicle, a road type, e.g. a built-up area, a freeway, country road, etc., a date, a time, a direction of travel and, from this, in particular also a time of day and by this means brightness information which influences the driver, as driving situation information.

Therefore, comprehensive characterization of the vehicle surroundings can be carried out on the basis of different sources from which an influence on the driving situation can result.

The driver state can preferably be sensed by means of a driver camera of the vehicle which is directed onto the driver of the vehicle and by means of which the behavior of the driver can be sensed with respect to his attentiveness.

The driver state is preferably dependent here on a viewing angle of the driver and/or a position of the hands of the driver, e.g. on the steering wheel or not, and/or a belt status, e.g. fastened or not, and/or a travel time and/or a rest time of the driver. It is therefore also possible to include in the assessment the behavior and the state of the driver of the vehicle and his driving habits. Furthermore, it is possible to determine whether the driver is inattentive or distracted or is concentrating and for example in the case of automated driving situations is actually present and touching the steering wheel and therefore can give his full attention to the events on the road.

A vehicle state of the vehicle can be determined, for example, in accordance with activation of a flashing indicator light of the vehicle and/or a warning flash warning light system of the vehicle and/or a vehicle lighting system of the vehicle, i.e. dipped headlight, full beam, headlight flasher etc., and/or an auxiliary headlight of the vehicle and/or an additional headlight of the vehicle and/or a windshield wiper stage of the vehicle and/or a passenger compartment lighting system of the vehicle. Accordingly it is possible to sense what state the vehicle is in, i.e. whether, for example, it is traveling in the rain, traveling in the dark, making a turn, in a stationary situation etc.

Therefore, a series of driving situation information items are available, which can be used to carry out characterization of the current driving situation of the vehicle and on the basis of which a prediction can be made, using the neural algorithm, about the future events on the road involving the vehicle. In particular, in this context it is also possible to take into account the driver state of the actual driver, i.e. how quickly the driver is able to intervene at all in the events on the road.

The categorization or assessment by means of the neural algorithm can take place, for example, in at least three driving situation categories, wherein, on the basis of the current driving situation, an uncritical driving situation is predicted for a first driving situation category, a medium-critical driving situation is predicted for a second driving situation category, and a critical driving situation is predicted for a third driving situation category.

By means of this categorization it is advantageously possible to specify a simple classification, in accordance with which the driver can selectively intervene in the events on the road. If, accordingly, when an uncritical driving situation is predicted, i.e. the first driving situation category is output, the driver can retain his driving style and his degree of attentiveness since an accident is improbable.

However, if a medium-critical driving situation is predicted, i.e. the second driving situation category is output, at least a problematic (medium-critical) driving situation is present in the future, to prevent which driving situation the driver can already intervene in the events on the road during the current driving situation, in order, for example, to avoid an emergency braking operation and/or an abrupt steering intervention, which would be necessary to completely alleviate the problematic driving situation, i.e. prevent a collision. Therefore, through preventative intervention by the driver it is already possible to prevent occurrence or initiation of the predicted driving situation, so that an emergency braking operation and/or an abrupt steering intervention in order to avoid a collision can advantageously be refrained from, and therefore better controllability of the vehicle is provided. That is to say the medium-critical driving situation which is predicted for the future advantageously becomes an uncritical driving situation by virtue of the preventative intervention.

It is comparable with a prediction of a critical driving situation, i.e. the third driving situation category is output, wherein at least one medium-critical driving situation and at best an uncritical situation can then be achieved by means of preventative intervention by the driver. Without such intervention, a collision would certainly occur.

In order to achieve the categorization by means of the neural algorithm, the neural algorithm can be trained by means of a training database, wherein a multiplicity of driving situation information items from training driving situations which have been actually carried out in the past and in which the vehicle can also currently find itself as well as a predicted driving situation assigned to the training driving situations and the corresponding driving situation categories are stored in the training database. In this context, it is possible to have recourse, for example, as a training database to a database in which a multiplicity of training driving situations in which the vehicle can also currently find itself are stored with a respectively manually assigned driving situation category. For this purpose, on the basis of the respective driving situation for the training driver situation it is possible to analyze which predicted driving situation has been brought about according to an embodiment of the invention by the respective training driving situation in the past, i.e. which driving situation category a specific training driving situation is to be assigned to.

Therefore, for the learning process, it is preferably advantageously possible to have recourse to a multiplicity of actual "trials" which have been carried out in other vehicles in the past (training driving situations) and in this context preferably to use an already existing system which already makes available a multiplicity of such assignments with which the neural network can be extensively trained. As a result, the reliability can be increased, since the neural network can correspondingly be extensively modified in a learning phase.

The learning phase can in this context preferably take place according to the learning rule of monitored learning ("supervised learning", "back propagation"), i.e. the driving situation information from training driving situations is specified to the neural algorithm as input values, and the driving situation categories of the predicted driving situations assigned thereto are specified as a known output value of the neural algorithm. Therefore, the neural algorithm is trained by specifying the "correct response", so that said neural algorithm generates the correct output value after an extensive training phase even without the correct answer being specified.

The training or the learning process of the neural algorithm can take place here preferably on a high-performance computing unit outside the vehicle, so that it is not necessary to install high-performance-capable computing units in the vehicle itself in order to carry out complex computing operations, and therefore additional installation space in the vehicle is not taken up. Only the trained neural network is then used in the vehicle in the way described above, for example in the form of a computer program product.

The neural algorithm can also be updated here in that, for example additional training in which newly added categorized training driving situations are added takes place, for example, at certain time intervals or continuously. Said training driving situations can originate here from the vehicle in question or else also from other vehicles. The updated, newly trained neural algorithm can then be transmitted to the vehicle or else to other vehicles so that there can advantageously be an adequate reaction to newly added driving situations, and the accuracy and reliability of the trained neural network can also be increased overall.

The additional training can advantageously be limited or aimed in a targeted fashion at training driving situations which have been incorrectly assessed by the existing, i.e. not yet updated, neural algorithm in the respective driving situation. That is to say mainly driving situations which in the past brought about a critical or medium-critical driving situation, but which were categorized as a driving situation which will be uncritical in the future by the neural algorithm with the training status which was present at this time, are adopted as training driving situations. Therefore, a current driving situation has developed into a medium-critical or critical driving situation without the driver being able to adapt to it. In the respective vehicle, this incorrect estimation can be correspondingly stored with an additional fault message and subsequently transferred to the high-performance computing unit as an incorrectly estimated training driving situation, which computing unit carries out the additional training of the neural network. The training can in this way also be carried out in a targeted fashion with respect to faults or incorrect hits, in order to modify the neural network further and in future also react quickly to these driving situations which were incorrectly categorized in the past.

Depending on the output value it is then advantageously possible to generate a warning or a message to the driver. For example, when the first driving situation category is present a green warning light can be output, or else a warning can be dispensed with, so that the driver is informed that everything is satisfactory. In the second driving situation category, a red warning light can be output, so that the driver is at least alerted to the imminent medium-critical driving situation and accordingly can react adequately, in order already to alleviate this driving situation predictively. In the third driving situation category, an acoustic and, if appropriate, also haptic warning can alternatively or additionally be output to the driver on the basis of the imminent critical driving situation, so that the driver recognizes the seriousness of the imminent driving situation and directs his full attention to the events on the road, in order to avoid an imminent accident, e.g. through a predictive intervention.

The outputting of the warning preferably takes place in good time before the initiation of the predicted driving situation, preferably an intervention time period before the initiation of the predicted driving situation, so that it is possible to react to a collision in a preventative fashion. The intervention time period can accordingly be, for example, at least 3 seconds to 4 seconds, i.e. more than the driver reaction time, preferably at least twice as long as the driver reaction time. However, depending on the availability and training status of the neural algorithm, the intervention time period can also occur long before the initiation of the predicted driving situation.

The assessment module according to an embodiment of the invention, for carrying out the method according to an embodiment of the invention, can, for example, be arranged in the vehicle and can have an input interface, an output interface and the neural algorithm stored on an assessment unit, as a computer program product which contains the neural network which has already been trained. The driving situation information which characterizes the current driving situation and which can be categorized into driving situation categories by the neural algorithm is fed to the input interface as input values. An output value which is dependent on the driving situation category can be output from the output interface for further processing, for example in order to generate the warning signal to the driver which is dependent thereon.

According to FIG. 1, a vehicle 100, in particular a utility vehicle, is shown on a roadway 11 in any desired current driving situation G. In addition, an object 10 on the roadway 11 is located at an object distance D from the vehicle 100, wherein the object 10 is moved with a certain object longitudinal velocity vl10 and an object longitudinal acceleration al10 along a certain trajectory which can also be predicted for the future on the basis of the driving dynamics of the object 10. The object 10 is another road user, for example another vehicle. The current driving situation G is illustrated only by way of example and kept very simple in this context. It is also possible for other objects to be located on or next to the roadway 11.

The vehicle 100 is moving along the roadway 11 along a certain trajectory with a vehicle velocity v100 and a vehicle longitudinal acceleration al100. Different monitoring modules 2, 5, 7 and sensor arrangements 3, 6, 8 which are illustrated only in a highly schematic form in FIG. 1, and an assessment module 1 which is connected thereto are provided in the vehicle 100 and interact with one another as follows:

FIG. 2 shows the assessment module 1 which has an input interface 1a and an output interface 1b. Different input values E, which can be processed and assessed in the assessment module 1, can be specified to the assessment module 1 via the input interface 1a. The assessment module 1 can be integrated, for example, in a control unit 12 which is a component of a driver assistance system 50 (not illustrated), e.g. ACC, ABS, EBC, etc. and/or of a brake system 60 of a vehicle 100.

For this purpose, the input interface 1a is connected, for example, to a surroundings monitoring module 2 which is able, by means of a surroundings sensor arrangement 3 which can have, for example, a radar sensor 3a, a surroundings camera 3b, an ultrasonic sensor 3c, an infrared sensor 3d, a laser sensor 3e etc., to monitor vehicle surroundings U around the vehicle 100, so that a vehicle surroundings characteristic CU can be produced. Furthermore, a navigation device 3f, which outputs navigation information NI, can be part of the surroundings sensor arrangement 3. The individual sensors 3a . . . f of the surroundings sensor arrangement 3 are schematically illustrated in a box in FIG. 2, but can also be located at different positions in the vehicle 100.

The surroundings monitoring module 2 receives surroundings signals SU, which have the output values of the individual sensors 3$a$ . . . $f$, from the surroundings sensor arrangement 3 and assesses whether and how possibly present objects 10 in the vehicle surroundings U behave and how these objects 10 move in this context, in particular relative to the vehicle 100. This can occur in accordance with a sensed number N of objects 10 in the vehicle surroundings U and/or an object longitudinal velocity vl10 and/or an object lateral velocity vq10 and/or an object longitudinal acceleration al10 and/or an object lateral acceleration aq10 and/or the object distance D and/or an object dimension C10 and/or an object type T10 and/or a relative position P10 and/or a roadway marking FM and/or a roadway characteristic FC and/or a current absolute vehicle position P100 of the vehicle 100 and/or a road type TS and/or current time information tI and/or a direction of travel FR of the vehicle 100.

All this information can be obtained from the surroundings sensor arrangement 3 and permit the vehicle surroundings U for the current driving situation G to be characterized. It is therefore possible with the surroundings monitoring module 2 to process and output driving situation information FI in accordance with the surroundings signals SU, which driving situation information FI characterizes the conditions under which the vehicle 100 is moving in the vehicle surroundings U so that the influence which the vehicle surroundings U is expected to have on the vehicle 100 in the current driving situation G can be derived therefrom.

Furthermore, the assessment module 1 is connected to a driving dynamics monitoring module 5 which is designed to determine actual driving dynamics DI of the vehicle 100 by means of a driving dynamics sensor arrangement 6. The driving dynamics sensor arrangement 6 can for this purpose have, for example, a velocity sensor 6$a$ for acquiring the vehicle velocity v100 of the vehicle 100, a longitudinal acceleration sensor 6$b$ for acquiring a vehicle longitudinal acceleration al100 of the vehicle 100, a lateral acceleration sensor 6$c$ for acquiring a vehicle lateral acceleration aq100 of the vehicle 100, a yaw rate sensor 6$d$ for acquiring a yaw rate G of the vehicle 100, and at least one wheel speed sensor 6$e$ for acquiring wheel speeds vR of at least one wheel 9 of the vehicle 100. The individual sensors 6$a$ . . . $e$ of the driving dynamics sensor arrangement 6 are illustrated schematically in a box in FIG. 2 but can also be located at different positions in the vehicle 100.

The driving dynamics monitoring module 5 receives driving dynamics signals SF, which have the output values of the individual sensors 6$a$ . . . $e$, from the driving dynamics sensor arrangement 6 and assesses the actual dynamics DI of the vehicle 100, wherein the actual driving dynamics DI follows from the output values of the individual above-mentioned sensors 6$a$ . . . $e$. In this context, stability information which follows from the output values can also be processed, said information being, for example, a brake slip or a drive slip which follows from the wheel speeds vR.

It is therefore possible with the driving dynamics monitoring module 5 to process and output, in accordance with the driving dynamics signals SF, driving situation information FI which characterize which actual dynamics DI the vehicle 100 has in the current driving situation G, i.e. how the vehicle 100 is moving in the vehicle surroundings U.

Furthermore, the assessment module 1 is connected to a driver monitoring module 7 which senses a driver state ZD by means of a driver sensor arrangement 8, for example with a driver camera 8$a$ which is directed onto the driver 200. In this context, for example movement or behaviors of the driver 200 are understood as the driver state ZD. The driver monitoring module 7 receives here driver signals SB, for example as image signals, and assesses the driver state. Accordingly, for example a viewing angle ZD1 of the driver 200 and/or a position ZD2 of the hands of the driver 200 and/or a belt status ZD3 can be assessed. Furthermore, a travel time ZD4 and/or a rest time ZD5 of the driver 200, i.e. how long the driver is already in place and how long the last rest was, can be acquired from the driver signals SB. From this it can be inferred how attentive or tired the driver 200 is expected to be or how much concentration he is expected to have and therefore be able to follow the events on the road.

Therefore, with the driver monitoring module 7 it is possible to process and output, in accordance with the driver signals SB, driving situation information FI which characterizes how the driver state ZD of the driver 200 is in the current driving situation G and how well the driver 200 is expected to perceive the current driving situation G.

Setpoint driving dynamics DS of the vehicle 100 and a vehicle state ZF can be determined as further driving situation information FI and transmitted to the assessment module 1. The setpoint driving dynamics DS of the vehicle 100 follow, for example, from a retarder setpoint specification RSoll for the vehicle 100 and/or a steering angle setpoint specification wSoll for the vehicle 100 and/or an accelerator pedal setpoint specification aSoll for the vehicle 100, i.e. an acceleration specification, and/or a brake pedal setpoint specification zSoll for the vehicle 100, i.e. a deceleration specification, and/or a clutch setpoint specification KSoll for the vehicle 100. These are specified by the driver 200 by means of a corresponding activation device and permit definitive information to be obtained about the current driving situation G, for example whether an acceleration of the vehicle 100 is desired or an abrupt steering process. The vehicle state ZF is characterized, for example, by activation of a flashing indicator light ZF1 of the vehicle 100 and/or a flash warning light system ZF2 of the vehicle 100 and/or a vehicle lighting system ZF3 of the vehicle 100 and/or an auxiliary headlight ZF4 of the vehicle 100 and/or an additional headlight ZF5 of the vehicle 100 and/or a windshield wiper stage ZF6 of the vehicle 100 and/or a passenger compartment lighting system ZF7 of the vehicle 100.

The respective monitoring module 2, 5, 7 outputs the signals SU, SF, SB, received from the respective sensor arrangements 3, 6, 8, to the input interface 1$a$ of the assessment module 1, so that different input values E can be specified in parallel to the assessment module 1. The received signals SU, SF, SB can be output in pre-processed form by the respective monitoring module 3, 6, 8 or even directly without processing here. The vehicle state ZF and the setpoint driving dynamics DS of the vehicle 100 are specified as further input values E to the neural algorithm NA via the input interface 1$a$, so that a multiplicity of information items relating to the current driving situation G are made available as input values E.

In the assessment module 1, the input values E are transmitted to a neural algorithm NA which is implemented on an assessment unit 1$c$. The neural algorithm NA is here a program or computer program product which is run on the assessment unit 1$c$ and which functions as follows in the manner of an artificial neural network:

Accordingly, the neural algorithm NA firstly receives the input values E in an input layer via one or more neurons, processes said input values E, e.g. into one or more processing layers (e.g. hidden layers) and outputs output values O again by means of neurons of an output layer. In the processing layer, in this context the input values E which are specified to the input layer are characterized into a previously defined number of categories by means of a weighted interaction of a plurality of neurons as is customary in a trained neural network. The category which is as a result assigned to the input values E is output again as an output value O from the neural algorithm NA.

In this case, the transmitted driving situation information FI, which is categorized into driving situation categories FKi with a serial index "i" by the neural algorithm NA, serves as input values E. All the abovementioned driving situation items FI are linked to one another here to the effect that they can supply an overall impression of the current driving situation G when the driving situation information items FI which are present for a specific point in time are combined with one another. That is to say with the driving situation information FI it is possible to characterize the current driving situation G from different viewing angles. In this context, all the driving situation information items FI can influence the current events on the road involving the vehicle 100 and therefore also influence future events on the road.

The neural algorithm NA is trained in such a way that it predictively assesses or predicts which driving situation is expected to follow in future, in particular on the basis of the currently present driving situation information FI or the current overall impression of the current driving situation G, which are specified as input values E. This driving situation which is forecast for the future is referred to below as the predicted driving situation GZi. The driving situation information FI or the current driving situation G is categorized here by means of the neural algorithm NA, wherein the number of categories, the driving situation categories Fki, is dependent on the possible number of predicted driving situations GZi, i.e. the index "i". The driving situation categories Fki are therefore linked to the predicted driving situations GZi:

It is possible, for example, for three different driving situation categories Fki to be provided, i.e. i=1, 2, 3. A first driving situation category Fk1 indicates that an uncritical driving situation GZ1 is predicted for the future, a second driving situation category Fk2 indicates that a medium-protocol driving situation GZ2 is predicted for the future, and a third driving situation category Fk3 indicates that a critical driving situation GZ3 is predicted for the future.

If a first driving situation category Fk1 is output as an output value O after an assessment of the current driving situation G by the neural algorithm NA, an uncritical driving situation GZ1 is predicted for the future and an accident in the future is rather improbable—even without the full attention of the driver 200 and without intervention or reaction by the driver 200.

If a second driving situation category Fk2 is output as an output value O after assessment of the current driving situation G by the neural algorithm NA, a medium-critical driving situation GZ2 is predicted for the future, i.e. an at least problematic, medium-critical, driving situation GZ2 can develop from the current driving situation G in the further course of driving under the currently present conditions if the driver 200 does not pay full attention to the current events on the road and also does not intervene in a preventative fashion into the events on the road. This is to be understood e.g. as a driving situation in which an accident can only now be avoided with an emergency braking operation and/or with a steering intervention if preventative intervention into the events on the road has not already been carried out by the driver 200 during the current driving situation G.

If a third driving situation category Fk3 is output as an output value O during an assessment of the current driving situation G by the neural algorithm NA, a critical driving situation GZ3 is predicted for the future, in which driving situation GZ3 an accident is very probable, in particular will certainly take place if the driver 200 does not pay full attention to the current events on the road and does not intervene in a preventative fashion in the events on the road. Insofar as a preventative intervention in the current events on the road is certainly required in the case of this categorization in order to avoid, on the basis of the current driving situation G, an accident in the future with corresponding consequences of an accident.

These assessments or categorizations can already be carried out here by means of the neural algorithm NA if, on the basis of the driving dynamics of the vehicle 100 and the behavior or the situation of the vehicle surroundings U in the current driving situation G, a medium-critical or critical driving situation is not yet present or has not yet been initiated but rather is only imminent or will begin to develop in the future. Therefore, the current driving situation G at the point in time of the assessment still differs from the predicted driving situation GZi, in particular from the medium-critical or critical driving situation GZ2, GZ3 in the future. In this respect, the preventative assessment is already made and accordingly it is also possible to issue a warning and/or react in a preventative fashion.

It is therefore possible for accident avoidance to take place in a more controlled fashion by predicting a medium-critical driving situation GZ2, which will follow in the future, in the second driving situation category Fk2, since a reaction thereto can already take place preventatively, e.g. can already take place during the still existing current driving situation G, and as a result an accident can, if appropriate, also already be avoided without carrying out an emergency braking operation and/or a steering intervention. By means of the preventative assessment of a critical driving situation GZ3, which will follow in the future, in the third driving situation category Fk3, it is possible also to prevent an accident in this category in that the driver 200 already intervenes earlier, e.g. already during the still existing current driving situation G, even if under certain circumstances an emergency braking operation and/or a steering intervention are/is necessary for this. Accordingly in the best case an uncritical driving situation can follow from a predicted medium-critical or critical driving situation by virtue of a preventative intervention.

In this respect, the assessment according to an embodiment of the invention differs from conventional accident avoidance systems or accident warning systems in which a warning is issued or a reaction is carried out, and on the basis of the concept of such systems can be issued and carried out, only if, for example, currently present limiting values for an object distance D or a relative velocity vrel have been undershot and accordingly a medium-critical or critical driving situation or an accident situation has already started to develop. Therefore, the current driving situation G, in which the assessment is carried out, does not differ in conventional systems from the medium-critical or critical driving situation GZ2, GZ3 to which there is to be a reaction, so that in such systems it is, as it were, the case that assessment can be carried out and at the same time a corresponding reaction can be carried out only when the "predicted driving situation" GZi according to the present invention here is present.

In order to be able to perform this categorization in these three driving situation categories Fk1, Fk2, Fk3, the neural network or the neural algorithm NA has to be previously trained in a so-called learning phase ("deep learning"), wherein this takes place in a high-performance computing unit 70 outside the vehicle 100, in order to save installation space in the vehicle 100 and export operations which are complex in terms of computing and which do not necessarily have to be carried out in the vehicle 100 itself. The training or the learning process occurs according to known patterns or learning rules, for example by means of monitored learning ("supervised learning", "back propagation"). Accordingly, driving situation information FI can be fed as training driving situations TG to the neural network which is to be trained or the neural algorithm NA in the high-performance computing unit 70, of which driving situations the driving situation category Fk1 or the predicted driving situations GZi are already known. As a result, in the learning phase, weightings are set or modified between the respective neurons of different layers of the neural network and an activity level of the neurons.

If, in a subsequent test phase, e.g. also in the vehicle 100, the driving situation information FI, from which the output value O or the driving situation category Fki is known, is input again as input values E, the correct output value O, i.e. the respective driving situation category Fki and accordingly the predicted driving situation GZi, follows, given a successful learning phase. In this way, the neural algorithm NA or the neural network learns how it categorizes driving situation information FI correctly as input values E. As a result, in future also previously unknown driving situation information FI of a still unknown current driving situation G can be assigned with high accuracy to a driving situation category Fki by means of an assessment according to an embodiment of the invention, which assessment is then carried out in the vehicle 100 by means of the trained neural algorithm NA which is then installed in the assessment module 1.

With the artificial neural network or the neural algorithm NA it is therefore possible, given a sufficiently high number of known driving situation information items FI or training driving situations TG with a known output value O, that is to say with a known driving situation category Fki or known predicted driving situations GZi, to create or build a neural network with which a driving situation category Fki can be assigned to each currently present (new) driving situation G by assessing it, for example even for the current driving situation G which is illustrated in FIG. 1 and in which the corresponding driving situation information FI is included. The more driving situation information FI which is available here, to which the artificial neural network was also trained, the more reliable this categorization can be.

In order to make available a sufficiently high number of driving situation information items FI with known output values O for training the neural algorithm NA in the high-performance computing unit 70, it is possible to have recourse, for example, to a training database 4 which already contains such assignments. For example the SmartDrive system (http://www.smartdrive.net/) which has already been used and built is suitable as a training database 4. In the training database 4, the abovementioned driving situation information FI relating to the vehicle surroundings characteristic CU, the actual driving dynamics DI, the setpoint driving dynamics DS, the driver state ZD and the vehicle state ZF for different training driving situations TG which have already been present in the past in some other vehicle is collected and categorized into the driving situation categories Fk1. This categorization takes place, for example, manually in that the training driving situations TG to which certain driving situation information items FI are assigned and which can also be present currently for the vehicle 100 are analyzed to determine whether they have brought about an uncritical, a medium-critical or a critical driving situation GZ1, GZ2, GZ3 according to the abovementioned categorization at a subsequent point in time which follows at least one intervention time period tB later. This categorization can be determined, for example, by means of camera signals of the vehicle surroundings U which are also available to the respective training database 4.

Accordingly the basis which is used can be which driving situation information FI or training driving situations TG were actually present in a specific intervention time period tB before the initiation of an uncritical, medium-critical or critical driving situation GZ1, GZ2, GZ3. This intervention time period tB can be selected in a variable fashion, in particular in such a way that the driver 200 has sufficient time to react correspondingly after a predictive assessment of the current driving situation G which has been characterized on the basis of this intervention time period tB by the neural algorithm NA, in order still to avoid a specific predicted driving situation GZi. For this purpose at least the driver reaction time tR, preferably at least twice the driver reaction time tR, i.e. at least 3 to 4 seconds, can be preferably set for this.

The intervention time period tB is, however, also limited by the sensors which are used, in particular of the surroundings sensor arrangement 3, since the vehicle surroundings U and also movements of other objects 10 can only be sensed to a limited extent. The intervention time period tB can also be subsequently changed, e.g. in order to set the response behavior of the assessment module 1 and adapt it to the vehicle 100. This driving situation information FI at the given intervention times tB for the respective training driving situations TG are then used with the respective categorization to train the artificial neural network or the neural algorithm NA in the manner of monitored learning ("supervised learning", "back propagation").

Since the SmartDrive system is already in use, a large number of assignments or categorizations of training driving situations TG have already been performed, so that the weightings and activity levels of the neurons of the neural network can be correspondingly set or modified using this training database 4 in a learning phase, in order to generate a reliable output value O for any desired current driving situation G.

In addition, it is, however, also possible for an updated neural algorithm NA to be made available to the vehicle 100 in specific time intervals. For this purpose, additional training in which categorized training driving situations TG which are to be newly added in the training database 4 to the neural network in a renewed learning phase can take place in the high-performance computing unit 70 in certain time intervals or continuously. Said training driving situations TG can originate here from the vehicle 100 in question or else also from other vehicles. The updated, newly trained neural algorithm NA can then be transmitted to the vehicle 100 or else to other vehicles, so that it is advantageously possible to react adequately to possibly newly added driving situations G, and also the accuracy and reliability of the trained neural network overall is increased.

The additional training can advantageously be limited here to or selectively oriented toward training driving situations TG which have been incorrectly assessed by an existing neural algorithm NA in the respective driving situation TG. That is to say mainly driving situations G which have in the past brought about a critical or medium-critical driving situation GZ2, GZ3 but which have been categorized as a driving situation GZ1 which will be uncritical in the future, by the neural algorithm NA with the "knowledge" or training status which is present at this time, are mainly adopted as training driving situations TG. Therefore, a current driving situation G has developed into a medium-critical or critical driving situation GZ2, GZ3 without the driver 200 being able to adapt to it.

In the respective vehicle 100 such an incorrect estimation can be correspondingly stored with an additional fault message H and subsequently transmitted as an incorrectly estimated training driving situation TG (H) to the high-performance computing unit 70 which carries out the actual training of the neural network. The training can in this way also be carried out selectively with respect to faults or incorrect hits, in order to continue to modify the neural network and in future also react correctly to these driving situations G which have been incorrectly classified in the past.

After driving situation information FI of the vehicle 100 which is specified to the assessment module 1 has been categorized by the trained neural algorithm NA and a corresponding output value O has been output and therefore a driving situation category Fki has been assigned to the current driving situation G, a specific action can follow in accordance with the driving situation category Fki:

When the first driving situation category Fki1 is present, that is to say in the case of a driving situation GZ1 which will be uncritical in the future for example no further action is carried out or a green control lamp lights up which indicates that everything is satisfactory.

If, in contrast, a medium-critical driving situation GZ2 will be present in future, said situation being classified in the second driving situation category Fk2, a optical warning signal WO can be output to the driver 200, for example in the form of a red warning lamp. As a result, the driver 200 is to be informed that on the basis of the current driving situation G an accident is probable in the future, which accident can also only be prevented by an emergency braking operation or a full braking operation and/or a steering intervention if the driver 200 does not intervene immediately in the events on the road or does not pay full attention to said events. In order therefore to avoid manual full braking or full braking initiated by an emergency brake device and/or a steering intervention, the driver 200 is informed that he is to be active as far as possible himself in the current driving situation G, in order to make the intervention more controlled.

If a critical driving situation GZ3 is present for the future, which driving situation is classified in the third driving situation category Fk3, an acoustic warning signal WA is additionally or alternatively output which is intended to prompt the driver 200 to intervene in all cases in the current driving situation G or to pay full attention to said driving situation G, since an accident is predicted which, without immediate intervention by the driver 200, has a high probability of bringing about an accident with serious consequences.

The respective action can either be prompted by the assessment module 1 or else by another control unit, wherein the corresponding driving situation category Fki or the output value O is output in an output signal SA via the output interface 1b.

The warning WO, WA is issued an intervention time period tB, also set in the learning process, before the initiation of the predicted driving situation GZi, so that the driver 200 is still given enough time to react.

According to FIG. 3, the method according to an embodiment of the invention can be carried out, for example, as follows:

In an initial step St0 after the initialization in the driving mode, it is possible for the driving situation information FI for the current driving situation G to be read in via the input interface 1a in a first step St1, wherein the driving situation information FI is determined as described in order to obtain an overall impression of the current driving situation G from different viewing angles, i.e. from the actual driving dynamics DI of the vehicle 100, the setpoint driving dynamics DS of the vehicle 100, a driver state ZD, a vehicle state ZF and a vehicle surroundings characteristic CU. In a second step St2, the driving situation information FI is fed as input values E to the neural algorithm NA. The latter "processes" said input values E in a third step St3 according to the described classification system in the manner of a trained artificial neural network and, in a fourth step St4, outputs an output value O which assigns a driving situation category Fki to the driving situation information FI and accordingly indicates which predicted driving situation GZi is expected to develop from the current driving situation G. In a fifth step St5, a warning WA, WO can then be issued to the driver 200 in accordance with this driving situation category Fki, so that the driver can already react in a preventative fashion and direct his attention fully onto the events on the road if necessary.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

1 Assessment module
1a Input interface

1b Output interface
1c Assessment unit
2 Surroundings monitoring module
3 Surroundings sensor arrangement
3a Radar sensor
3b Surroundings camera
3c Ultrasonic sensor
3d Infrared sensor
3e Laser sensor
3f Navigation device
4 Training database
5 Driving dynamics monitoring module
6 Driving dynamics sensor arrangement
6a Velocity sensor
6b Longitudinal acceleration sensor
6c Lateral acceleration sensor
6d Yaw rate sensor
6e Wheel speed sensors
7 Driver monitoring module
8 Driver sensor arrangement
8a Driver camera
9 Wheel
10 Object
11 Roadway
12 Control unit
50 Driver assistance system
60 Brake system
70 High-performance computing unit
100 Vehicle
200 Driver
al10 Object longitudinal acceleration
aq10 Object lateral acceleration
al100 Vehicle longitudinal acceleration
aq100 Vehicle lateral acceleration
aSoll Accelerator pedal setpoint specification
C10 Object dimension
CU Vehicle surroundings characteristic
D Object distance
DI Actual driving dynamics
DS Setpoint driving dynamics
E Input values
FC Roadway characteristic
FI Driving situation information
Fki Driving situation category
Fk1 First driving situation category
Fk2 Second driving situation category
Fk3 Third driving situation category
FM Roadway marking
FR Direction of travel
G Current driving situation
GZi Predicted driving situation
GZ1 Uncritical driving situation
GZ2 Medium-critical driving situation
GZ3 Critical driving situation
H Fault message
Index
KSoll Clutch setpoint specification
N Number
NA Neural algorithm
NI Navigation information
O Output values
P10 Relative position
P100 Absolute vehicle position
RSoll Retarder setpoint specification
SA Output signal
SB Driver signal
SF Driving dynamics signal
SU Surroundings signal
T10 Object type
tB Intervention time period
TG Training driving situation
tI Time information
tR Driver reaction time
TS Road type
U Vehicle surroundings
vl10 Object longitudinal velocity
vq10 Object lateral velocity
v100 Vehicle velocity
vrel Relative velocity
vR Wheel speeds
wSoll Steering angle setpoint specification
WA Acoustic warning signal
WO Optical warning signal
ZD Driver state
ZD1 Viewing angle
ZD2 Position of hands
ZD3 Belt status
ZD4 Travel time
ZD5 Rest time
ZF Vehicle state
ZF1 Flashing indicator light
ZF2 Flash warning light system
ZF3 Vehicle lighting system
ZF4 Fog light
ZF5 Additional headlight
ZF6 Windshield wiper stage
ZF7 Passenger compartment lighting system
zSoll Brake pedal setpoint specification
St1, St2, St3, St4, St5 Steps of the method

The invention claimed is:
1. A method for the predictive assessment of a current driving situation of a vehicle, in particular utility vehicle, comprising at least the following steps:
   determining, based on sensor data signals provided by one or more sensors of the vehicle, currently present driving situation information, wherein the driving situation information characterizes the current driving situation of the vehicle,
   running a neural algorithm on a computer of an assessment unit of the vehicle,
   specifying the driving situation information to the neural algorithm, wherein the neural algorithm assigns, in the manner of a trained neural network, a driving situation category to the currently present driving situation information,
wherein the respective driving situation category is based on a predicted driving situation,
   wherein the neural algorithm determines the predicted driving situation in accordance with the current driving situation and the predicted driving situation indicates a driving situation of the vehicle which will develop at a future time relative to the current driving situation; and
   outputting by the neural algorithm at all times and regardless of the driving situation category, an output value characterizing the driving situation category, as an assessment result,
   outputting a warning to the driver of the vehicle in accordance with the driving situation category,
   changing the output value between:
      a first driving situation category and a second driving situation category, and
      the second driving situation category and a third driving situation category, wherein the warning is output an intervention time period before the initiation of the predicted driving situation, wherein the intervention time period is at least twice the driver reaction time, and is at least 3 to 4 seconds.

2. The method as claimed in claim 1, wherein the driving situation information which characterizes the current driving situation is dependent on actual driving dynamics of the vehicle and/or setpoint driving dynamics of the vehicle and/or a vehicle surroundings characteristic of vehicle surroundings and/or a driver state of a driver of the vehicle and/or a vehicle state of the vehicle.

3. The method as claimed in claim 2, wherein the actual driving dynamics of the vehicle are dependent on a vehicle velocity of the vehicle and/or a vehicle longitudinal acceleration of the vehicle and/or a vehicle lateral acceleration of the vehicle and/or a yaw rate of the vehicle and/or a wheel speed of at least one wheel of the vehicle.

4. The method as claimed in claim 3, wherein the actual driving dynamics of the vehicle is determined with at least one sensor selected from the group composed of a velocity sensor for acquiring the vehicle velocity of the vehicle, a longitudinal acceleration sensor for acquiring the vehicle longitudinal acceleration of the vehicle, a lateral acceleration sensor for acquiring the vehicle lateral acceleration of the vehicle, a yaw rate sensor for acquiring the yaw rate of the vehicle and at least one wheel speed sensor for acquiring a wheel speed of at least one wheel of the vehicle.

5. The method as claimed in claim 2, wherein the setpoint driving dynamics of the vehicle is determined in accordance with a retarder setpoint specification for the vehicle and/or a steering angle setpoint specification for the vehicle and/or an accelerator pedal setpoint specification for the vehicle and/or a brake pedal setpoint specification for the vehicle and/or a clutch setpoint specification for the vehicle.

6. The method as claimed in claim 2, wherein the vehicle surroundings characteristic of the vehicle surroundings is determined in accordance with a number of objects in the vehicle surrounding and/or an object longitudinal velocity and/or an object lateral velocity and/or an object longitudinal acceleration and/or an object lateral acceleration and/or an object distance between the vehicle and the object and/or an object dimension and/or an object type and/or a relative position of the object relative to the vehicle and/or a roadway marking on a roadway in the vehicle surroundings and/or a roadway characteristic of the roadway and/or a current absolute vehicle position of the vehicle and/or a road type and/or time information and/or a travel direction of the vehicle.

7. The method as claimed in claim 6, wherein the vehicle surroundings characteristic of the vehicle surroundings is determined with at least one sensor selected from the group composed of a radar sensor of the vehicle, a surroundings camera of the vehicle, an ultrasonic sensor of the vehicle, an infrared sensor of the vehicle and a laser sensor of the vehicle, and/or from navigation information which is made available by a navigation unit of the vehicle.

8. The method as claimed in claim 2, wherein the driver state of the driver is dependent on a viewing angle of the driver of the vehicle and/or a position of the hands of the driver of the vehicle, and/or a belt status of the vehicle and/or a travel time and/or a rest time in each case of the driver of the vehicle.

9. The method as claimed in claim 8, wherein the driver state of the driver of the vehicle is determined by a driver camera which is directed onto the driver of the vehicle.

10. The method as claimed in claim 2, wherein the vehicle state of the vehicle is determined in accordance with activation of a flashing indicator light of the vehicle and/or a flash warning light system of the vehicle and/or a vehicle lighting system of the vehicle and/or an auxiliary headlight of the vehicle and/or an additional headlight of the vehicle and/or a windshield wiper stage of the vehicle and/or a passenger compartment lighting system of the vehicle.

11. The method as claimed in claim 1, wherein the current driving situation differs from the predicted driving situation, and the assessment takes place during the current driving situation.

12. The method as claimed in claim 1, wherein categorization into at least three driving situation categories takes place by means of the neural algorithm, wherein on the basis of the current driving situation an uncritical driving situation is predicted for the first driving situation category, a medium-critical driving situation is predicted for the second driving situation category, and a critical driving situation is predicted for a third driving situation category.

13. The method as claimed in claim 1, wherein the neural algorithm is trained by means of a training database, wherein driving situation information of training driving situations and a predicted driving situation assigned to the training driving situations and/or assigned driving situation categories are stored in the training database.

14. The method as claimed in claim 13, wherein the driving situation information of the training driving situations are specified to the neural algorithm as input values, and the driving situation categories of the predicted driving situations assigned thereto are specified as known output values of the neural algorithm, for training the neural algorithm according to the learning rule of the monitored learning.

15. The method as claimed in claim 13, wherein updating of the neural algorithm takes place, wherein for this purpose the neural algorithm is additionally trained with newly added training driving situations.

16. The method as claimed in claim 15, wherein driving situations are specified as newly added training driving situations, for which driving situations a fault message has been stored, wherein the fault message is indicative of an incorrect estimation of the not yet updated neural algorithm for the respective driving situation.

17. The method as claimed in claim 1, wherein the neural algorithm is trained and updated on a high-performance computing unit, wherein the high-performance computing unit is arranged outside the vehicle, and the neural algorithm which is trained thereto is made available to the vehicle for the assessment.

18. An assessment module for a vehicle, in particular utility vehicle, for carrying out a method as claimed in claim 1 comprising:
an input interface, an output interface and the assessment unit on which the neural algorithm is stored, wherein driving situation information which characterizes the current driving situation can be fed to the input interface as input values, and the output value which characterizes the driving situation category can be output from the output interface for further processing.

19. A vehicle, in particular utility vehicle, having the assessment module as claimed in claim 18.

20. A vehicle as claimed in claim 19, wherein the assessment module is integrated into a control unit of the vehicle, for example into a control unit of a driver assistance system and/or of a brake system of the vehicle.

21. A non-transitory computer program product having program code for carrying out the method as claimed in claim 1.

\* \* \* \* \*